(12) United States Patent
Kotsovinos et al.

(10) Patent No.: US 7,900,005 B2
(45) Date of Patent: Mar. 1, 2011

(54) METHOD AND SYSTEM FOR THE TRANSPARENT MIGRATION OF VIRTUAL MACHINES STORAGE

(75) Inventors: Evangelos Kotsovinos, London (GB); Robert Bradford, London (GB)

(73) Assignee: Zimory GmbH, Berlin (DE)

( * ) Notice: Subject to any disclaimer, the term of this patent is extended or adjusted under 35 U.S.C. 154(b) by 495 days.

(21) Appl. No.: 12/070,754

(22) Filed: Feb. 20, 2008

(65) Prior Publication Data

US 2008/0222375 A1    Sep. 11, 2008

(30) Foreign Application Priority Data

Feb. 21, 2007  (EP) .................................. 07003555

(51) Int. Cl.
*G06F 12/16* (2006.01)
(52) U.S. Cl. ............................... 711/162; 711/E12.103
(58) Field of Classification Search ................. 711/162, 711/E12.103, 161, 165; 709/230
See application file for complete search history.

(56) References Cited

U.S. PATENT DOCUMENTS

| | | | |
|---|---|---|---|
| 2005/0268298 A1 | 12/2005 | Hunt et al. | |
| 2006/0005189 A1 | 1/2006 | Vega et al. | |
| 2006/0200821 A1 | 9/2006 | Cherkasova et al. | |
| 2006/0218544 A1* | 9/2006 | Chakraborty et al. | ....... 717/168 |
| 2008/0215796 A1* | 9/2008 | Lam et al. | ................... 711/100 |

FOREIGN PATENT DOCUMENTS

EP    1589412    10/2005

OTHER PUBLICATIONS

Kozuch, Michael et al.: "Internet Suspend/Resume", Intel Research Pittsburgh, IRP-TR-02-01, published in WMCSA (2002).
Hand, Steven et al.: "Controlling the XenoServer Open Platform", University of Cambridge Computer Laboatory; published in Openarch (2003).

(Continued)

*Primary Examiner* — Pierre-Michel Bataille
(74) *Attorney, Agent, or Firm* — Leydig, Voit & Mayer, Ltd.

(57) ABSTRACT

Method for transferring storage data of a virtual machine to be migrated from a first host device to a second host device via a communication network, including: running the virtual machine on the first host device; storing, on a local storage device of the first host device, a disk image used by the virtual machine; detecting, while the virtual machine is running on the first host device, any changes made to the disk image used by the virtual machine; establishing a connection over the communication network from the first host device to the second host device; transferring, to the second host device while the virtual machine is running on the first host device, the disk image used by the virtual machine and the detected any changes made; modifying the disk image transferred to the second host device in response to the detected any changes transferred to the second host device; and starting, using the modified disk image, a migrated virtual machine on the second host device at a current state of the virtual machine running on the first host device.

16 Claims, 6 Drawing Sheets
(3 of 6 Drawing Sheet(s) Filed in Color)

OTHER PUBLICATIONS

Barham, Paul et al.: "Xen and the Art of Virtualization"; University of Cambridge Computer Laboratory; SOSP (2003).

Kotsovinos, Evangelos, et al.: "Global-Scale Service Deployment in the XenoServer Platform"; University of Cambridge Computer Laboratory; published in Worlds (2004).

Warfield, Andrew et al.: "Facilitating the Developmet of Soft Devices"; University of Cambridge Computer Laboratory; published in USENIX (2005).

Foster, Ian et al.: "The Anatomy of the Grid, Enabling Scalable Virtual Organizations"; published in Intl. Journal of High Performance Computing Applications (2001).

Hansen, Jacob Gorm et al,: "Self-migration of Operating Systems"; Department of Computer Science, University of Copenhagen; published in EW11: ACM SIGOPS European Workshop (2004).

Sapuntzakis, Constantine P. et al.: "Optimizing the Migration of Virtual Computers"; Computer Science Department, Stanford University; published in OSDI (2002).

Osman, Steven et al.,: "The Design and Implementation of Zap: A System for Migrating Computing Environments"; Department of Computer Science, Columbia University; published in SIGOPS Oper. Syst. Rev. (2002).

Nelson, Michael et al.: "Fast Transparent Migration for Virtual Machines"; Proceedings of USENIX '05: General Track, Anaheim, California, USA, Apr. 10-15, 2005, pp. 391-394.

Clark, Christopher et al.: "Live Migration of Virtual Machines"; XP-002443245; published in NSDI (2005): 2nd Symposium on Networked Systems Design & Implementation.

Travostino, Franco et al: "Seamless live migration of virtual machines over the MAN/WAN"; Future Generation Computer Systems 22 (2006), Elsevier, pp. 901-907.

* cited by examiner

METHOD AND SYSTEM FOR THE TRANSPARENT MIGRATION OF VIRTUAL MACHINES STORAGE

REFERENCE TO RELATED APPLICATIONS

This application claims the benefit of European Patent Application No. 07 003 filed Feb. 21, 2007, which is hereby incorporated by reference herein.

FIELD

The present invention relates in general to methods and systems for the transparent migration of virtual machine storage and in particular to a method and a system for transferring storage data of a virtual machine from a first host device to a second host device via a communication network.

BACKGROUND

Virtualization is of growing importance in the world of IT deployments, in particular in the fields of data centers and wide-area server infrastructures.

In the data centre virtualization allows the consolidation of services in such a way as to provide the control and protection facilities normally associated with dedicated separate hardware and software environments without higher costs. As an example it may be wise to separate the publicly visible web server of a company from the internal intranet server hosting potentially valuable material. For security reasons these would often be deployed on separate physical machines to provide the appropriate protection environment, however, neither will use the full capacity of resources provided by the physical hardware. These two separate physical machines could be replaced by a single server running virtualization software such as Xen or VMWare in order to provide a protection mechanism to effectively and securely separate the two services within their own virtual machines. The Xen technology has been described for example by Barham, P. et al. in the publication "Xen and the art of virtualization", SOSP (2003).

The sharing of a single physical host is also helpful in reducing the cost of deploying services. Both in terms of the saving in the initial cost of deployment by reducing the costs of hardware investment but also in the longer term by reducing the costs of hardware maintenance.

By removing the tight coupling between the physical machine and the services that are running on it through the use of virtualization it paves the way to allowing the movement of live services, enveloped within a virtual machine, from one physical host to another, without severely disrupting them. This technology is virtual machine migration. Virtual machine migration is very useful in supporting for example load balancing, allowing virtual machines to be moved from more to less busy servers, failover and dynamic relocation of latency-sensitive services. Furthermore, it can be used to maintain a high uptime for a service by allowing it to be migrated to a different physical machine if the original host must be taken down for maintenance. Similarly, migration can also be used to allow for the transparent upgrade of the physical host.

The majority of virtual machine migration technologies rely on shared storage between the source and destination hosts. Such shared storage may be provided by using specialist hardware and networking in a Storage Area Network (SAN) or using a network file system. One disadvantage of these is the higher cost of the extra hardware needed to provide for this. They are also not suitable for situations where the performance or privacy available from local storage is necessary. Additionally, they do not enable migration of virtual machines in the wide area, where shared storage is generally not available.

In the wide-area virtual machine migration is also useful since it allows moving latency intolerant services, such as interactive game servers, closer—in terms of network distance—to the clients. This reduces the round-trip latency and hence improves the quality of the game for the players. In order to ensure that the game environment is fair the server should be migrated to a position as equidistant from each of the players as possible. Furthermore, wide-area migration is useful for load balancing across multiple data centers, for instance to balance demand peaks generated during certain times of the days.

U.S. patent application No. 2006/0005189 A1 describes Systems and Methods for Voluntary Migration of a Virtual Machine between Hosts with Common Storage Connectivity. The known system allows migrating virtual machines between servers that are connected to an external storage device such as a network-attached storage (NAS) server. Therefore, the persistent state, i.e. the file system used by the virtual machine to be migrated does not need to be migrated. The system only migrates the device information (i.e. updates the relevant operating system structures on the destination server to allow connection to the common storage after the VM is migrated).

Further known approaches used to ensure that a migrated virtual machine does not use any local storage, and that both the source and the destination server can access the virtual machine's file system by connecting to a remote file server are described, for example, by Nelson, M. et al. in the paper "Fast transparent migration for virtual machines", published in USENIX 2005 (2005), by Osman, S. et al. in the paper "The design and implementation of Zap: a system for migrating computing environments", published in SIGOPS Oper. Syst. Rev. (2002) and by Hansen, J. G. et al. in the paper "Self-migration of operating systems", published in EW11: ACM SIGOPS European workshop (2004).

For example, network file system (NFS) is a commonly used protocol for implementing such systems using remote storages in the local area. Distributed file systems such as Coda, the Andrew File System, the Common Internet File System, and the Global File System allow using remote file servers even in the wide area. Peer to peer file systems such as xFS and Farsite allow virtual machines to use a set of unknown remote peers for storing their persistent state.

However, the I/O performance of such systems is far lower than that of local disks, thus making them unsuitable for a large number of applications and types of usage—for instance, for databases or storing swap files. At the same time, the storage of virtual machine data on untrusted peers may be incompatible with the trust and privacy requirements of commercial services using the virtual machines. Additionally, all above solutions require that custom file system software is installed and used by the migrated virtual machine, which introduces administration overhead.

Furthermore in platforms such as XenoServers and Grids, migration is often used to bring services closer to their clients, in order to reduce round-trip latency. The Grid platform is described by Foster, I. et al. in the paper "The anatomy of the Grid: Enabling scalable virtual organization", published in Int'l Journal of High Performance Computing Applications (2001).

A further approach called State capsules uses remote storage devices and an on-demand fetching process. The State capsules is described by Sapuntzakis, C. et al. in the paper "Optimizing the Migration of Virtual Computers", published in *OSDI* (2002). This approach enables to migrate the memory of a virtual machine first, then fetch any data needed from the source host on-demand. Network Block Device and iSCSI allow clients to access remote storage devices as if they were local. This can be used to allowing the migrated virtual machine at the destination host to access its file system exported by the source host over the network.

This technique enables a migrated virtual machine to start running on the destination host before its entire file system is transferred to the destination. However, this requires that the source host remains available and accessible for a substantial amount of time after the migration, in order to keep hosting the file system of the migrated virtual machine until it has been transferred to the destination host. This results in residual dependency problems: such systems are vulnerable to unpredictable source host unavailability, for instance in the case of a network disconnection or power failure. In effect this halves the expected time until a host the virtual machine depends on fails. At the same time, requiring the cooperation of source hosts conflicts with the federated, disconnected nature of platforms such as XenoServers, Grids, and Planet-Lab, where servers are under the administrative control of different organizations and may be unpredictably shut down.

U.S. patent application No. 2005/268298 describes a system, method and program to migrate a virtual machine.

The known system facilitates migration of virtual machines by copying their memory including their "block memory", or data blocks that reside in a memory. If the virtual machine uses blocks that are not stored in the memory, they have to be loaded in memory first before migration can begin. This makes this system unsuitable for migrating virtual machines that use large amounts of local storage. Furthermore, this system does not perform live migration, i.e. the virtual machine has to be stopped at the source server while its data is being copied to the destination server.

European patent application No. 1 589 412 A2 describes a Computer data migration system which allows migrating of storage subsystems within a storage area network (SAN). As such, it requires that storage components use specialized storage area network hardware, and that a "Back End Server" is available, which controls the migration process and keeps track of where the migrated data resides. For this reason, this system is unsuitable for the end-to-end, unmediated migration of virtual machines. Furthermore, it does not support wide-area environments, where common storage access is not straightforward.

A simple way to allow the migration of a virtual machine that uses local storage is to freeze the virtual machine, copy its memory and persistent state, for instance using the scp command, and then start the virtual machine at the destination server. For example, the Internet Suspend/Resume approach allows suspending a personal computing environment and transporting it to another physical machine, where it is later resumed. This approach is described by Kozuch, M. et al. in *WMCSA* (2002).

However, this type of migration requires that the virtual machine be stopped before copying its persistent state to prevent file system consistency hazards. Thus, for file systems of a realistic size, this results in severe service interruption.

SUMMARY

In an embodiment, the present invention provides a method for transferring storage data of a virtual machine to be migrated from a first host device to a second host device via a communication network. The method includes: running the virtual machine on the first host device; storing, on a local storage device of the first host device, a disk image used by the virtual machine; detecting, while the virtual machine is running on the first host device, any changes made to the disk image used by the virtual machine; establishing a connection over the communication network from the first host device to the second host device; transferring, to the second host device while the virtual machine is running on the first host device, the disk image used by the virtual machine and the detected any changes made; modifying the disk image transferred to the second host device in response to the detected any changes transferred to the second host device; and starting, using the modified disk image, a migrated virtual machine on the second host device at a current state of the virtual machine running on the first host device.

DESCRIPTION OF THE DRAWINGS

The patent or application file contains at least one drawing executed in color. Copies of this patent or patent application publication with color drawings(s) will be provided by the Office upon request and payment of the necessary fee.

Aspects of the present invention will now be described by way of exemplary embodiments with reference to the following drawings, in which.

DETAILED DESCRIPTION

It is an aspect of the present invention to provide a method, a computer system for performing migration of virtual machines, and a computer-readable medium having stored instructions for performing migration of virtual machines which minimize downtime of the virtual machine to be migrated and further ensure file system consistency and transparency to the virtual machines and services running in them.

It is a further aspect of the present invention to provide a method and a system to facilitate the migration of virtual machines that use local storage devices for their persistent states.

The invention contemplates for example the following challenging requirements.

Live migration: Since it is necessary that the migrated virtual machine is not stopped during the migration, the method and system according to the invention performs the transfer of the virtual machine's local persistent state in parallel to the continuing operation of the virtual machine to be migrated.

Consistency: To enable the virtual machine running on a source host device to continue operating—and even modify its source file system—while the file system migration is in progress, and at the same time ensure consistency before the virtual machine is restarted at the destination host device, the method and system according to the invention intercept all writes made through a so called block module at the source host device. These writes are applied to the disk image used by the virtual machine running on the source host device and also sent to the destination host device where they are later applied to disk image which has been transferred from the source to the destination host device during a so called bulk transfer stage.

The method and system according to the invention further provides consistency and prevents write-after-write hazards. A write-after-write hazard may result in lost updates, which occur when older writes replace newer ones. We avoid such hazards in three ways: firstly, we use the TCP protocol to ensure reliable in-order deliver, of network packets. Secondly, changes, hereinafter also referred to as deltas, made to the disk image at the source host device are not applied at the destination host device until the transfer of the disk image is complete. Finally, the deltas generated during the virtual machine migration are applied at the destination host device in the order in which they occurred. With the above measures together, all changes to the source disk image are recreated in the same order at the destination host device, thus consistency is provided. Therefore, the present invention ensures that the disk image at the destination host device is consistent with the one at the source host device at one point in time: when the migrated virtual machine starts executing at the destination host device.

Minimal service disruption: Virtual machine migration can cause disruption to the services—from a user's perspective—by incurring a high virtual machine downtime, which in extreme cases results in the timeout and disconnection of TCP sessions to and from the services running in the migrated virtual machine. The method and system according to the invention achieve a low virtual machine downtime by supporting live migration of local persistent state. At the same time, it integrates the memory-only migration framework in use, e.g. Xen's live migration system, which ensures a low virtual machine downtime at the end of the entire migration process. The entire migration process includes both the transfer of the disk image and the changes made to the disk image at the source host device.

Disruption may also be caused by contention on resources such as network bandwidth, processor cycles, and local disk throughput, between the service and the migration process. Our system addresses this by combining rate limiting of the migration process with write throttling.

Transparency: To ensure that out-of-the-box services can be migrated without requiring reprogramming or reconfiguration, and minimize the number of changes or special software modules required, to the method and system implemented at the block level—instead of the file system level. It does not require that virtual machines use a certain type of custom file system; it enables migrating any type of file system used by the virtual machine, including swap. At the same time, by performing migration at the block level we avoid the complexity of dealing with the sharing semantics that exist at the file system level.

The above mentioned technical problem and requirements are solved by a method for transferring storage data of a virtual machine from a first host device to a second host device via a communication network according to an exemplary embodiment of the present invention. The method may include:

a) running at least one virtual machine to be migrated on a first host device;

b) storing a disk image used by said at least one virtual machine to be migrated on a local storage device of said first host device;

c) detecting any changes made to the disk image while the virtual machine to be migrated is running on the first host device;

d) establishing a connection over the communication network from the first host device to a second host device;

e) transferring the disk image used by the virtual machine to be migrated and the detected changes to the second host device while the virtual machine to be migrated keeps running on the first host device, f) modifying the disk image transferred to the second host device in response to all changes transferred to the second host device, and g) starting the migrated virtual machine on the second host device at the current state of the virtual machine running on the first host device by using the modified disk image.

It is to be understood, that the order of the method steps a) to g) does not necessarily define their chronological execution. It is only a list of steps used to perform the invention.

In the description and the claims the term "disk image" defines in particular at least one file of a file system or a file system itself and may be also referred to as a local persistent state of a virtual machine. The step of transferring a disk image is also called a bulk transfer.

Moreover, it should be understood that the expression "migration of a virtual machine" includes the step of transferring storage data used by a virtual machine running on a source host device. The term "storage data" includes at least the disk image stored on the local storage device.

In order to ensure consistency between the disk image of the virtual machine running on the first host device and the disk image of the migrated virtual machine running on the second host device step c) includes the steps of intercepting, at least during the transfer of the disk image from the first host device to the second host device, any write operations that occur on the disk image used by the virtual machine of the first host device and generating a plurality of parameters which represent the modifications of the disk image resulting from the respective write operations and wherein step e) includes the step of transferring said plurality of parameters from the first host device to the second host device, wherein the plurality of parameters are queued at the second host device in the order in which they have been generated by the at least one virtual machine running on the first host device. The parameters are also referred to as deltas which represent the written data, the location of the written data on the local storage device and the size of the written data.

In an embodiment, the parameters queued at the second host device are applied to the disk image transferred to the second host device in the order in which they occurred at the first host device. Therefore, the migrated virtual machine starts running on the second host device using a modified disk image which is consistent with the current disk image used by the virtual machine running on the first host device.

In an embodiment, the memory state of the virtual machine running on the first host device is transferred during a so called memory migration state to the second host device without interrupting the virtual machine. The memory state which includes the run-time state of the first host device is stored for example in a random access memory (RAM). The memory migration stage itself is known. For example the memory data migration is controlled by the open source software Xen.

In an, the memory state is transferred after the transfer of the disk image from the first host device to the second host device has been completed.

In this case, step c) includes the step of intercepting, during the transfer of the disk image and the memory state from the first host device to the second host device, any write operations that occur on the disk image used by the virtual machine running on the first host device and generating a plurality of parameters which represent the modifications of the disk image resulting from the respective write operations.

After completion of the transfer of memory state the at least one virtual machine running on the first host device is paused and the migrated virtual machine is started at the second host device using the migrated disk image which has been modified in response to all parameters transmitted to the second host device. This method provides consistency between the virtual machine running on the first host device and the migrated virtual machine running on the second host device.

In order to avoid write-after write hazards the communication network is a TCP/IP based computer network or any other network that ensures in-order and reliable end-to-end delivery of the transmitted information.

In order to ensure transparency, as mentioned above, at least the disk image data is transferred block wise from the first host device to the second host device, and changes to it during that transfer at detected at the block level.

In order to handle write-intensive workload over the communication network, the number of write operations which can be executed by the virtual machine running on the first host device during a predetermined time period is defined by a threshold, so that a write operation exceeding the threshold is delayed by an adjustable delay value.

In an embodiment, the method and the computer system is implemented in a Xen environment. An exemplary Xen environment is called XenoServer platform and is, for example described by Hand, S. et al. in the paper "Controlling the XenoServer Open Platform", published in *OPENARCH* (2003)

The present invention also provides a computer system for transferring storage data of a virtual machine from a source host device to a destination host device. The computer system includes a plurality of host devices connectable over a communication network. A host device which is capable of operating as a source host device in the computer system includes at least one virtual machine which is able to run on the source host device, a local storage device for storing a disk image used by said at least one virtual machine to be migrated to a destination host device, detecting arrangement for detecting any changes made to the disk image while the virtual machine to be migrated keeps running on the source host device, migration arrangement for establishing a connection to the destination host device over the communication network, arrangement configured for pre-copying the stored disk image used by the virtual machine to be migrated and for transferring the pre-copied disk image to the destination host device without stopping the virtual machine to be migrated. A host device which is capable of operating as a destination host device includes storage arrangement for storing the transferred disk image and the changes made to the disk image used by the source host device and starting arrangement for starting a migrated virtual machine at the current state of a virtual machine running on the source host device.

In order to ensure consistency as mentioned above, the detecting arrangement is adapted to intercept, at least during the transfer of the disk image from the source host device to the destination host device, any write operations that occur on the disk image used by the virtual machine of the source host device and generating a plurality of parameters which represent the changes of the disk image resulting from the respective write operations. In this case the transferring arrangement is adapted to transfer said plurality of parameters from the source host device to the destination host device. Furthermore, the plurality of parameters is queued at the storage arrangement of the destination host device in the order in which they have been generated by the at least one virtual machine running on the source host device.

In an embodiment, the source host device includes storage arrangement for storing the memory state of the virtual machine running on the source host device and wherein the transferring arrangement is adapted to transfer the memory state to the destination host device without interrupting the virtual machine running on the source host device.

In an embodiment the host devices comprise a XenoServer.

The method and the computer system as set forth above enable the migration of the local persistent state of a running virtual machine by pre-copying it and transferring it from the source to the destination host device while the virtual machine operates on the source host device. During the transfer time a user-level block device operates to record and forward any write accesses to the destination host device, ensuring consistency.

Figure 1A:
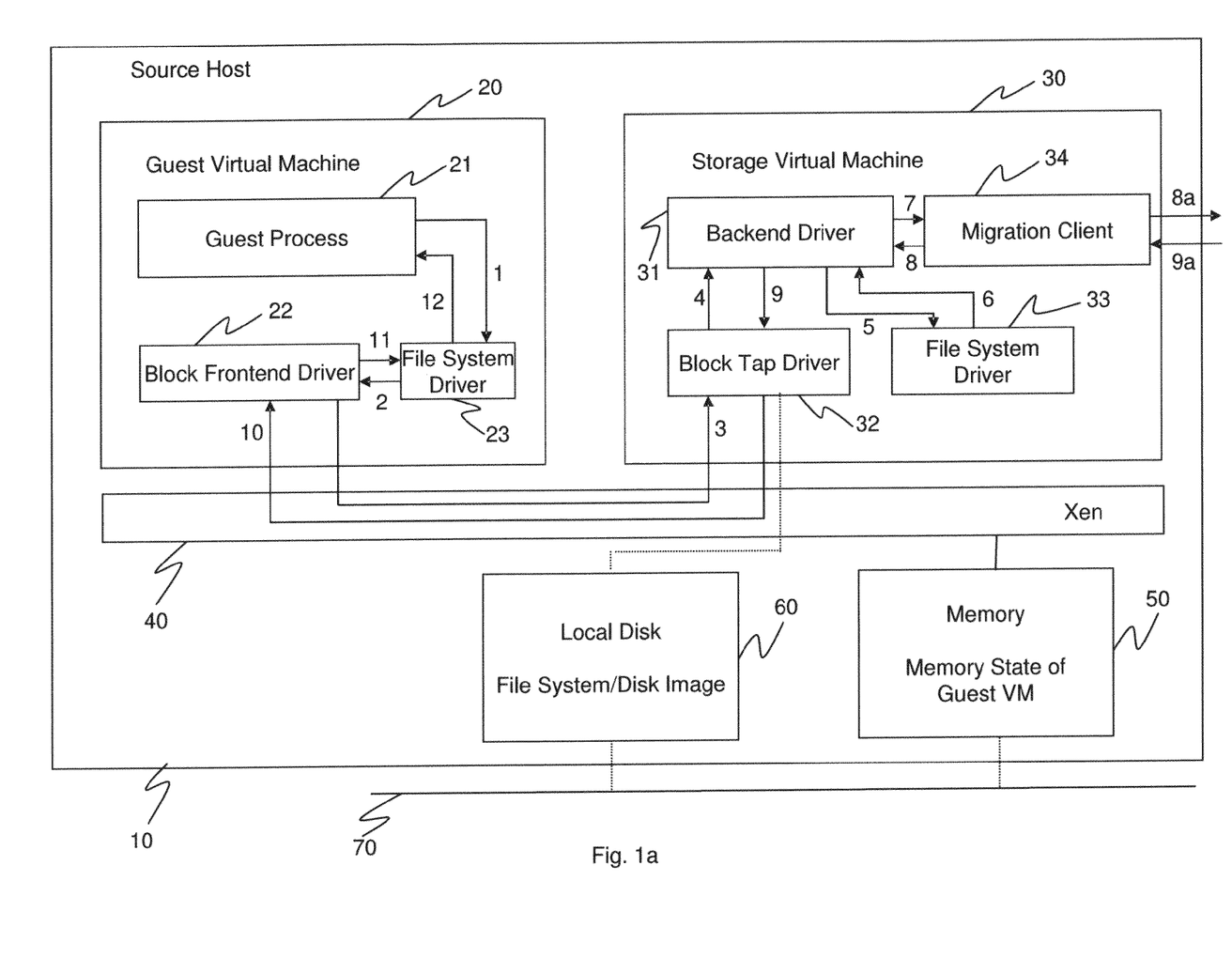
FIGS. 1*a* and 1*b* are illustrative block diagrams of a migration architecture according to an exemplary embodiment of the present invention, including a source and a destination host.
Figure 1B:
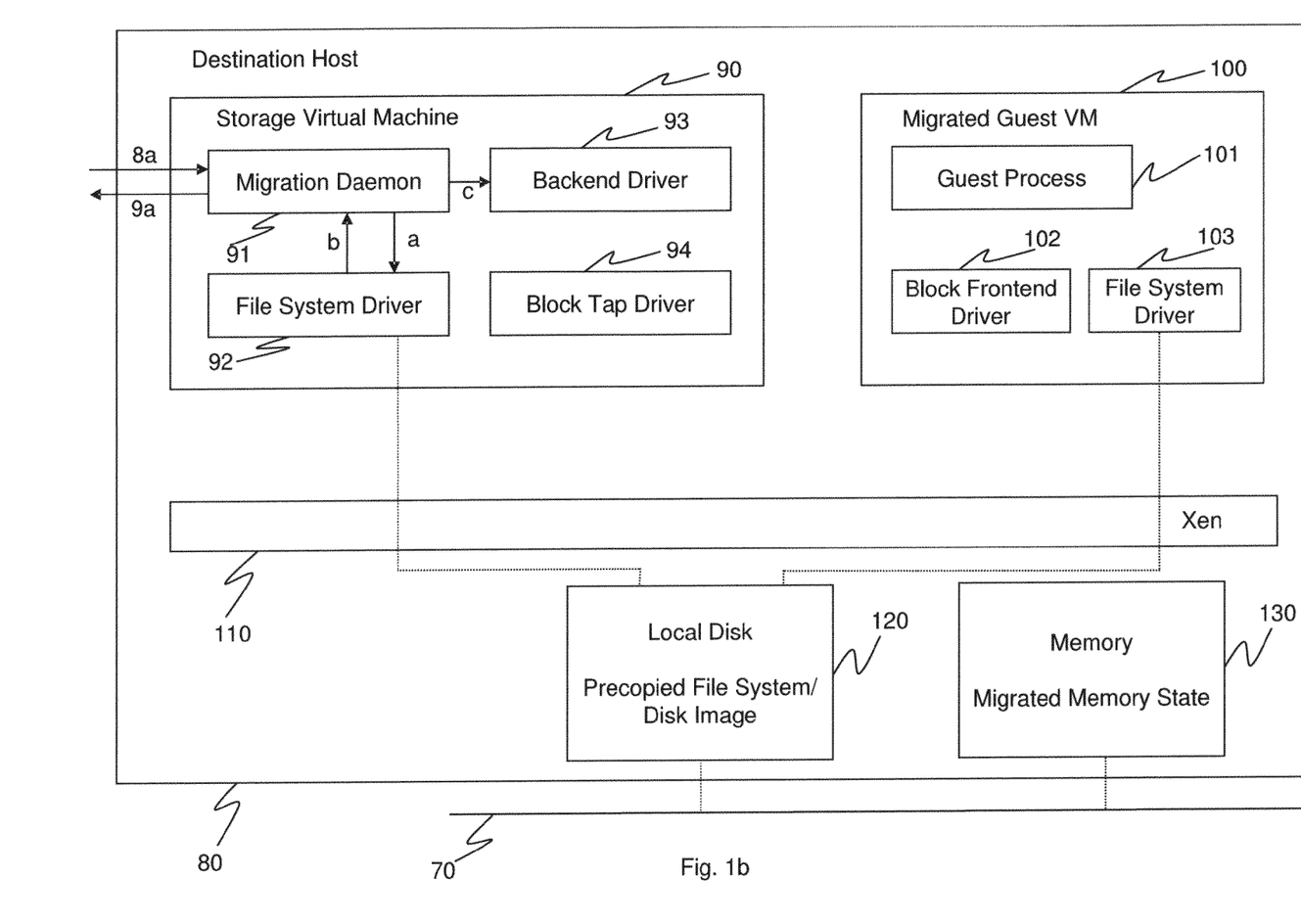

FIGS. 1a and 1b show an illustrative computer system which includes a plurality of host devices which are adapted to operate as a source host as well as a destination host. The host devices are connectable for example over a TCP/IP network such as Ethernet to perform migration of virtual machines as will be described below. The network is schematically depicted by an Ethernet connection designated by 70. In order to facilitate the illustration only two host devices 10 and 80 are depicted in FIG. 1a and FIG. 1b, respectively. Both host devices 10 and 80 are connected via the Ethernet connection 70. In the following illustration host device 10 is able to operate as a source host running at least one guest virtual machine 20 to be migrated and host device 80 is able to operate a destination host 80 which runs the migrated guest virtual machine 100. Virtual machine 100 is a clone of virtual machine 20 and is the result of the migration process.

Therefore, migration takes place between the source host 10 and the destination hosts 80 that both use a virtual machine monitor, e.g. Xen (40 and 110 respectively) to virtualise their hardware.

The virtual machines 20 and 100 of the source host 10 and the destination host 80, respectively, may be a standard, unprivileged guest virtual machine. If Xen is used, the virtual machines are running XenLinux—a patched Linux kernel that runs on Xen. The virtual machines 20 and 100 include frontend block device driver 22 and 102, respectively, the function of which is described in detail below.

Both the source and destination hosts include a storage virtual machine 30 and 90, respectively. If Xen is used, the storage virtual machines 30 and 90 are XenLinux ones and contain a block lap driver 32 and 94, respectively.

The block tap driver 32 is adapted to export block devices into the guest virtual machine 20. The guest virtual machine 20 uses these block devices for storing its root file system and swap files in a local storage device, such as local disk 60. The root file system includes a disk image used by the guest virtual machine 20. The disk image is also referred to as the local persistent state of the guest virtual machine 20. In a similar manner, the block tap driver 94 is adapted to export block devices into the guest virtual machine 100. The guest virtual machine 100 uses these block devices for storing its root file system and swap files in a local storage device, such as local disk 120, as shown in FIG. 1b.

As shown in FIG. 1a the guest virtual machine 20 performs a guest process 21. e.g. an application or a service which is able to access and write to the disk image stored in the local disk 60 using a file system driver 23. Both block frontend driver 22 and file system driver 23 are associated with the operating system kernel of virtual machine 20.

In a similar manner, the migrated guest virtual machine 100 running on the destination host 80 performs a migrated guest process 101, e.g. an application or a service which is able to access and write to the migrated disk image stored in the local disk 120 using a file system driver 103, as shown in FIG. 1b. Both block frontend driver 102 and file system driver 103 are associated with the operating system kernel of virtual machine 100.

Moreover, FIG. 1a shows, that the storage virtual machine 30 of the source host 10 includes a backend driver 31, a migration client 34 and a file system driver 33 which allow access to the whole content of the local disk 60.

The current memory state of the source host 10 is stored in a main memory 50 such as a random access memory. As will be described later, the memory state stored in the main memory 50 is migrated to the destination host 80 and stored in a main memory 130.

FIG. 1b further shows, that the storage virtual machine 90 of the destination host 80 includes a migration daemon 91, a backend driver 93 and a file system driver 92. If the Xen software is used the guest virtual machine 20 of source host 10 communicates via a Xen ring buffer 40 with the storage virtual machine 30, wherein the migrated guest virtual machine 100 of destination host 80 communicates via a Xen ring buffer 110 with the storage virtual machine 90.

The operation of the computer system is now illustrated in detail in connection with FIGS. 1a, 1b and 2.

It is assumed that the guest virtual machine 20 running on the source host 10 shall be transparently migrated to the destination host 80 without interrupting the guest virtual machine 20 while the migration process is in progress.

Figure 2:
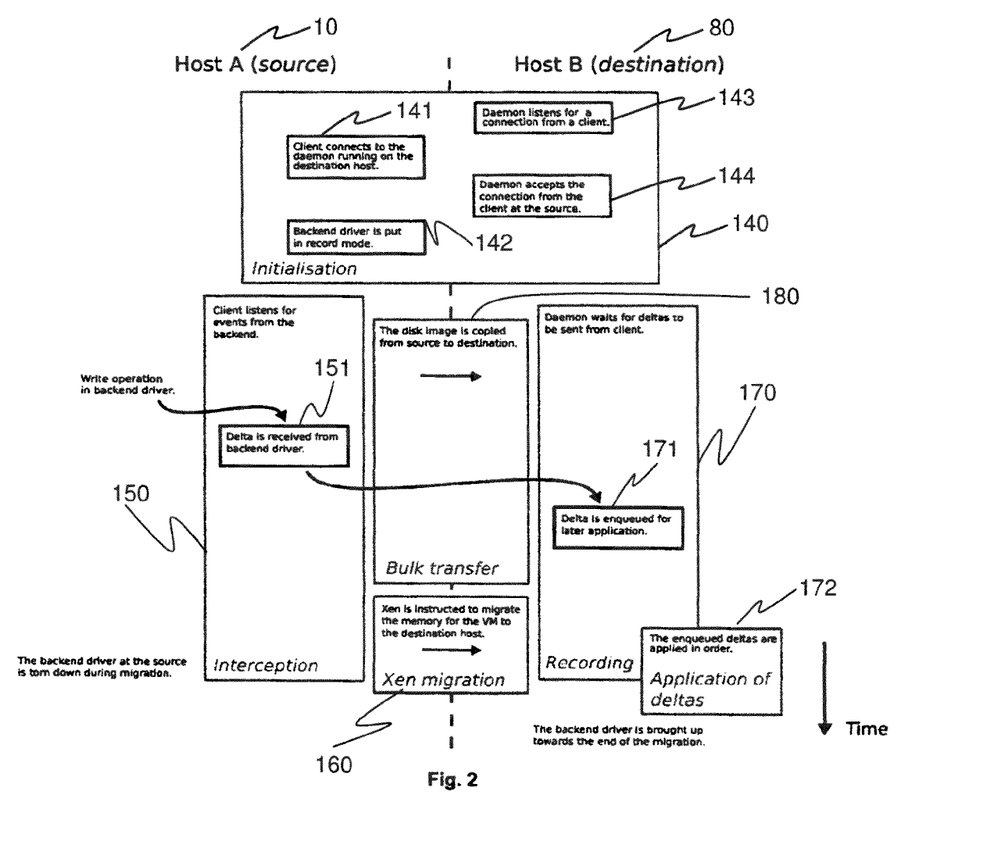
FIG. 2 is a flow chart of a migration process according to an exemplary embodiment of the present invention.

In an embodiment, the computer system operates in five stages, i.e. an initialization stage 140, a bulk transfer stage 180, an interception and recording stage 150, a memory state migration stage 160 and a stage 172 of application of deltas, as shown in FIG. 2.

In the beginning of the initialization 140 the storage virtual machine 90 of the destination host 80 starts running the migration daemon 91, which listens to migration connection requests transmitted from the storage virtual machine 30 of the source host 10 over the network 70, as shown at step 143. Furthermore, the initialization stage 140 ensures that there is sufficient space on the local disk 120 of the destination host 80. Issues related to performing authentication, authorization, and access control on requests are handled by the XenoDaemon software suite of the XenoServer platform. Now, at step 141, the source host 10, in particular the storage virtual machine 30 starts running the migration client process on the migration client 34, which establishes for example an Ethernet connection over the network 70 to communicate with the migration daemon 91 on the destination host 80 to perform the migration of the guest virtual machine 20 by transferring the disk image stored in local disk 60, the memory, state data stored in the main memory 50 and all modifications made to the disk image during the transfer, as will be explain below in more detail. At step 144, the migration daemon 91 receives a connection set up request from the migration client 34 and accepts the connection.

When a virtual machine migration is requested on the source host 10 the migration client 34 creates a separate listener process for the interception stage 150 to listen for events from the backend driver 31 and signals to the backend driver 31, also referred to as a user-space block device driver, to enter the record mode at step 142. Once in the record mode, the backend driver 31 is prepared to copy the details of any writes that are made to the disk image stored on the local disk 60 to the listener process, which transfers them to the migration daemon 91. Meanwhile, the migration client 34 starts the bulk transfer stage 180, which pre-copies the disk image stored in the local disk 60 of the virtual machine 20 to be migrated from the source host 10 to the destination host 80 whilst the virtual machine 20 continues to run.

At the destination host 80, the migration daemon 91 starts running two processes. The first process is used to receive deltas from the migration client 34 running in the storage virtual machine 20 at the source host 10. The second process is the end point for the bulk transfer.

In particular, during the bulk transfer stage 180 the disk image used by the guest virtual machine 20 is transferred from the local disk 60 at the source host 10 to the destination host 80 and stored in the local disk 120 whilst the disk image file is in use by the running virtual machine 20. Data blocks of the disk image are read from the local disk 60 in turn, and sent over the TCP connection to the migration daemon 91 at the destination host 80. The data blocks are assembled by the storage virtual machine 90 to the disk image and stored in the local disk 120. This is repeated until the end-of-file (EOF) is reached and detected by the migration daemon 91.

If the computer system is based on the XenoServers platform overlaying and Copy-on-Write techniques are used to reduce the amount of data transferred over the network 70 when starting or migrating a service. These techniques are described by Kotsovinos, E. et al. in the paper "Global-Scale Service Deployment in the XenoServer Platform", published in *WORLDS* (2004). They employ persistent caching of immutable template disk images on all host devices operating as XenoServers. Only the differences (or overlays) between the persistently cached templates and the customized disk image of the virtual machine 20 in question have to be transferred when starting or migrating the virtual machine 20. In such cases, the bulk transfer stage 180 can be adapted to copy only the contents of the overlay.

While performing the bulk transfer stage 180 any write operations made to the disk image stored in the local disk 60 are detected by the backend driver 31 and transmitted to the destination host 80 during the interception and recording stage 150.

Once the bulk transfer 180 of the disk image to the destination host 80 is completed, the source host 10 invokes the memory migration stage 160 provided for example by Xen. This facility iteratively copies memory pages stored in the memory 50 from the source host 10 to memory 130 at the destination host 80, all without stopping the execution of the guest virtual machine 20 being migrated. Within each iteration it logs dirtied pages on the guest virtual machine 20, which are transferred in the next iteration. The final phase of the memory migration stage 160 pauses the guest virtual machine 20 on the source host 10, copies any remaining memory pages to its clone memory 123 at the destination host 80, and resumes execution there. More details with respect to the operation of the Xen live migration feature are described by Clark, C. et al. in the publication "Live migration of virtual machines", published in *NSDI* (2005).

As the virtual machine 20 continues to run at the source host 10 during both the bulk transfer stage 180 and the memory migration stage 160, any changes made to the disk image stored in the local disk 60 are detected and forwarded to the destination host 80 and applied to the cloned disk image stored in the local disk 120 at the destination host 80.

Thus during both the bulk transfer stage 180 and the memory migration stage 160 the backend driver 31 at the source host 10 intercepts an % write operations that occur on the file system stored in the local disk 60, transfers them and records them, at steps 170 and 171, in a queue at the destination host 80 for later application to the cloned disk image.

We now refer to FIGS. 1*a* and 1*b* and illustrate the interception stage 150 and the recording stage 170 as shown in FIG. 2 in detail.

The backend driver 31 is designed to intercept any write operations made to the disk image used by guest virtual machine 20 of the source host 10 while the bulk transfer stage 180 and the memory migration stage 160 are performed. Write operations are applied to the local disk image 60 by the backend 31, and transferred to a queue at the destination host 80, where they are later applied in order. This ensures that the disk image copied to the local disk 120 at the destination host 80 is consistent with the disk image stored at the source host 10. It is to be noted, that applications and/or services in the migrated virtual machine 100 are able to run without interruption.

To intercept write operations on the disk image used by the guest virtual machine 20, the block tap framework of Xen is used. The block tap framework is for example described by Warfield, A. et al. in the paper "Facilitating the development of soft devices" published in *USENIX* (2005).

This allows the implementation of the backend drivers 31 and 93 in user-space, which can then be exported to the guest virtual machine 20. In particular it can be used for the root file system used by the guest virtual machine 20.

Xen block devices are implemented using a split-driver architecture, which includes a block frontend driver 22 that provides a raw block device in the kernel of the guest virtual machine 20. The block frontend driver 22 communicates with the backend driver 31 in the storage virtual machine 30 via a ring buffer 40. In the original Xen implementation the backend driver 31 is implemented in the kernel of the storage virtual machine 30 and provides only access to raw block devices.

The flow of control of a write operation is shown in FIGS. 1*a* and 1*b*.

When a file system access is made by the guest process 21 in the guest virtual machine 20 at step 1 a write request is passed through the file system driver 23 and into the block frontend driver 22 at step 2. The write request is then passed through the Xen ring buffer 40 to the block tap driver 32 in the storage virtual machine 30 at step 3.

Subsequently, the request is passed from the block tap driver 32 to the backend driver 31 using a shared memory interface via a character device at step 4. The backend driver 31 writes to the disk image stored in the local disk 60 using the file system driver 33 at step 5. When the write operation is acknowledged at step 6 details of the write operation are sent to the migration client 34 at step 7. After this point, the write request returns at steps 8, 9, 10, 11 and 12 to the guest process 21.

In parallel to this, the backend driver 31 converts the write operation into deltas, sends them, at step 8*a*, to the migration client 34 which in turn transfers the deltas to the migration daemon 91 running at the destination host 80. Deltas are queued there in the order then, are generated at the source host 10. Deltas include the written data modifying the disk image stored in the local disk 60, the location on the local disk 60 and the size of the written data Finally, the migration daemon 91 acknowledges receipt of the deltas at step 9*a*.

After the bulk transfer stage 180 is finished, and in parallel to the memory migration stage 160, the destination host 80 enters the stage 172 of application of deltas as shown in FIG. 2. During the application stage 172, at steps a and b) the migration daemon 91 applies each delta enqueued at the destination host 80 which have been intercepted on the source host 10 during the bulk transfer stage 180 and the memory migration stage 160—to the migrated disk image stored in the local disk 120 using the file system driver 92.

Any new writes that occur during the bulk transfer stage 180 and the memory migration stage 160 are queued on the destination host 80 and once again applied in the proper order to the migrated disk image. Once the queue of deltas is empty and the memory migration stage 160 is completed, the disk images stored at disk 60 used by the source host 10 and disk 120 used by the destination host 80 are consistent. Therefore, the destination host 80 delays any attempted write operations by the migrated guest virtual machine 100 until that point. Processing of write requests is resumed as soon as the migration daemon 91 indicates the completion of the application of deltas at step c. In the majority of cases the migration daemon 91 completes its work during the final stage 160 of the memory migration. Thus, no delay is added to the migration process.

Towards the completion of the memory migration stage 160, e.g. the Xen live migration, the guest virtual machine 20 on the source host 10 is paused, and its copy, i.e. the migrated guest virtual machine 100 is started at the destination host 80.

In order to handle highly write-intensive workloads at the source host 10 a write throttling mechanism has been implemented. This mechanism is based on a threshold and a delay. When the virtual machine 20 reaches the number of writes defined by the threshold, each further write it attempts is delayed by a delay parameter. Also, the threshold and delay are doubled to slowing writes further if the new threshold is reached. In practice, and for the cases the system has been tested with, we have found 16384 write operations per 320 seconds to be a suitable value for the initial threshold, and 2048 microseconds to be an effective initial delay parameter.

In the case where virtual machine migration takes place over the Internet between servers in different local area networks, the migrated virtual machine needs to obtain a new IP address on the destination server. Dynamic DNS updates can be used to ensure that all new connections are forwarded to the destination host. To minimize service disruption, the source host can redirect packets of open connections to the destination host using packet rewriting or IP tunneling—after ensuring that the MTU is small enough so that packets can be tunneled within IP Without fragmentation. Alternatively, open connections' packets may be redirected to the destination using a proxy or load balancer located between the client and the source host, such as the LocalDirector2.

In all above mentioned solutions open connections may experience performance degradation but, more importantly, they are not interrupted. Additionally, since most connections are short-lived—for instance those to virtual machines running web servers, the advantage of providing good performance to new clients is significant. Furthermore, redirection need not apply to both directions of traffic; packets transmitted to the migrated virtual machine need to be redirected through the source, but data from the virtual machine to the clients—which in most cases represent a higher volume of traffic—can be sent directly from the destination host.

Other possible solutions are the use of Mobile IP, HIP and SIP (Session Internet Protocol), or an end-to-end mobility schemes. These allow the redirection of all open connections to the new host, without significant disruption to the running services, but require that the hosts, the clients, and the migrated virtual machine support these protocols.

Experiments

In this section we describe the experiments undertaken to quantitatively evaluate the computer system along the following dimensions: firstly, we examine the disruption that virtual machine migration causes to the services as perceived by their users, in terms of delayed service responses. Our results demonstrate that our system does not significantly impact running services during live virtual machine migration. Disturbance can be limited even further by placing bandwidth caps on the network traffic imposed by the migration process. We also show that our system outperforms freeze-and-copy approaches in wide-area migrations as well as local-area migrations.

Additionally, our results show that the computer system is able to successfully handle workloads where virtual machines perform disk writes at an excessive rate—we term these diabolical workloads. Furthermore, our evaluation demonstrates that our system does not introduce a significant disk performance overhead compared to disk access using the unmodified block tap-based drivers.

We define the following metrics, which we use in the rest of this section to evaluate the above aspects of our system's operation:

The downtime refers to the time between pausing the virtual machine 20 on the source host 10 and resuming it on the destination host 80, during the final stage of memory migration.

The disruption time is the time during which guest process 21, running in the virtual machine 20 and migrated to become process 101 in migrated virtual machine 100, observes a reduction of service responsiveness—requests by the client take a longer time to return. This is caused mainly by pausing the virtual machine during the last stage of the memory migration. It is secondarily affected by network reconfiguration delays and the time taken to apply any outstanding deltas on the destination disk image. Disruption time is always greater than downtime, and provides a representative view of the effect of the migration from the viewpoint of a client using the service.

The migration time is the time from the point at which the migration is started by a migration request, to the point at which it is completed and the virtual machine 100 is running on the destination host 80. It denotes the overall duration of the migration process.

The number of deltas and delta rate denote the amount of changes made to the disk image stored in the local disk 60 during the bulk transfer stage 180. They are related to how write-intensive a given workload is, and thus are useful in evaluating the relative performance of the computer system under different workloads.

1.1 Workload Overview

Figure 3:
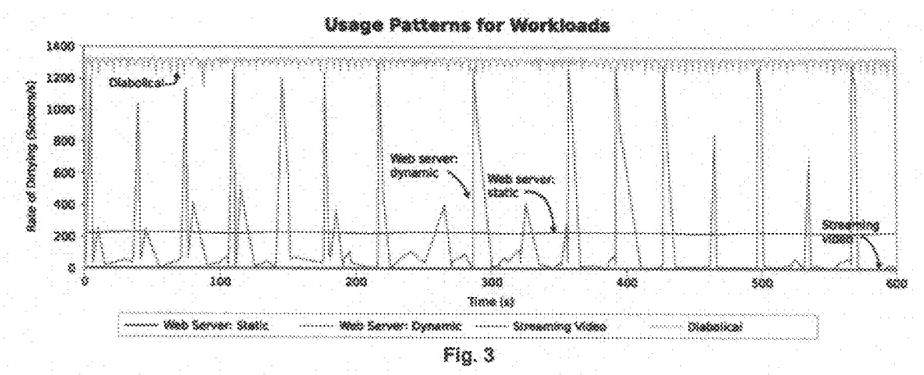
FIG. 3 is a diagram depicting a comparison of disk write behaviour of different workloads according to an exemplary embodiment of the present invention.

To demonstrate the effect of migrating with the computer system in terms of service disruption, we considered three basic workloads: that of a web server serving static content, that of a web server hosting a dynamic web application, and that of video streaming. These workloads reflect realistic usage cases found in the XenoServer platform, and at the same time neatly trifurcate the spectrum of I/O disk write load, as shown in FIG. 3. The dynamic web workload generates a large number of writes in bursts, the static web workload generates a medium, roughly constant number of writes, and the video streaming workload creates relatively few writes but is very latency sensitive. To these we added a diabolical workload, generating disk writes at a very high rate, to test our write throttling facility.

The chosen workloads are unsuitable for NAS-based migration. The cost of running a NAS server—in terms of money and effort—just for being able to migrate a web server is high. The dynamic web server would experience performance degradation by accessing its database over the network. Streaming high-resolution video in the network twice—from the NAS server to the streaming server, and then from the streaming server to the client—represents inefficient use of resources.

1.2 Experimental Setup

Figure 4:
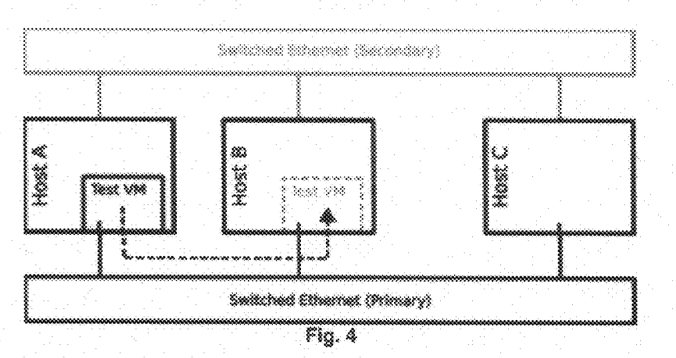
FIG. 4 is a block diagram of an experimental computer system used for simulation purposes according to an exemplary embodiment of the present invention.

For our experiments we used the configuration shown in FIG. 4. All hosts A, B and C were dual Xeon 3.2 Ghz with 4 GB DDR RAM and mirrored RAID arrays of U320 (10 k RPM) SCSI disks. All hosts were connected by two separate 100 Mbit switched Ethernet networks. Installed on hosts A and B was a snapshot of the Xen unstable release and XenLinux 2.16.13.

The virtual machine that was migrated was provided with 512 MB of RAM and configured to use a single CPU. The ext3 disk image that the virtual machine used was 1 GB in size, and contained installations of Debian GNU/Linux 3.1, the Apache 2.0 web server, and all the dependencies of the target web application including the MySQL database server. The privileged storage virtual machines on hosts A and B were using ext3 disk images for their file-backed file systems, and were hosting the backend block device driver as well as our migration client and daemon.

In all cases the virtual machine was migrated from host A to host B over the primary Ethernet network. Host C was used as the client of the services running in the virtual machine, generating HTTP requests to its services during the migration. These requests and the corresponding replies were transmitted over the primary network in all cases except the freeze-and-copy and wide-area migration experiments—Sections 1.4 and 1.5. During the evaluation period the machines were not used for any service that was not strictly necessary for the experiments undertaken. All throughput, disruption time, and interarrival time measurements were obtained using tcpdump. All experiments were repeated several times—the results shown are representative samples.

To emulate a wide-area network for the experiments in Sections 1.4 and 1.5 we used the Linux traffic shaping interface to limit bandwidth to 5 Mbps and add a round-trip latency of 100 ms between hosts A and B. This is representative of the connectivity observed between a host in London and a host in the east coast of the US.

1.3 Local-Area Migration Results

For each workload we describe the way it was generated, present our migration experiment, and discuss the results obtained. A summary of all results in this group of experiments can be found in Table 1. The discrepancy between our results and those of the Xen live migration experiments is due to the lower bandwidth available in our testing environment—100 Mbps compared to 1 Gbps in the Xen experiments.

TABLE 1

Summary of results recorded for the different workloads.

| | Migration time (s) | Disruption time (s) | Number of deltas | Delta rate (deltas/s) | Total transferred (MB) | Overhead |
|---|---|---|---|---|---|---|
| Static web content | 680 | 1.04 | 511 | 0.75 | 1643 | 7% |
| Dynamic web application | 196 | 3.09 | 1173 | 5.98 | 2085 | 36% |
| Streaming video | 148 | 3.04 | 5 | 0.03 | 1546 | 1% |
| Diabolical load | 811 | — | 39853 | 49.14 | 1692 | 10% |

The diabolical load experiment was the only one performed with write throttling enabled.

1.3.1 Web Server: Static Content

This test measured the disruption caused to a static web server, running in a virtual machine on host A, while the virtual machine was being migrated from host A to host B. Client HTTP traffic was generated on host C using SIEGE, a standard http performance testing utility. The load consisted of 25 clients simultaneously and repetitively downloading a 512 KB file from the web server, making the experiment network-limited.

To evaluate the disruption observed by the client during migration, we measured the throughput of the HTTP traffic before, during, and after the migration. We also measured the throughput of the different protocols in use in the different migration stages.

Figure 5:
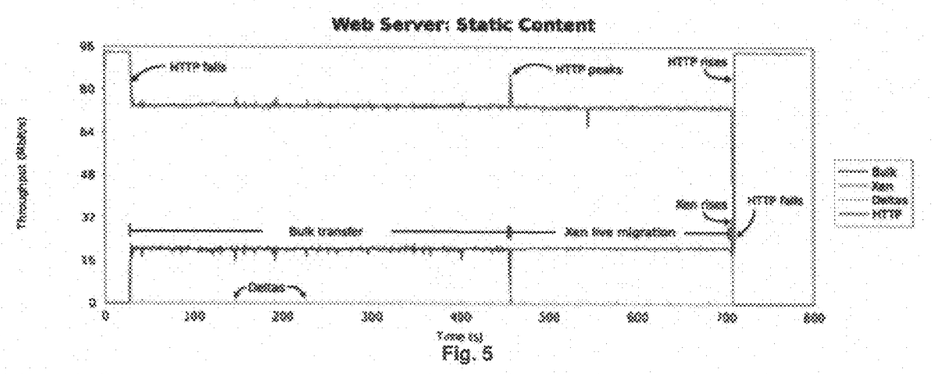
FIG. 5 is a diagram depicting a throughput of migration protocols during VM migration under static web load according to an exemplary embodiment of the present invention.

The results of this experiment are shown in FIG. 5. Migration starts after 25 seconds, causing a drop in HTTP throughput as part of the network is used for the bulk transfer. After 450 seconds the Xen migration stage starts. The migration process terminates after approximately 700 seconds, causing a brief drop in HTTP throughput—and thus an increase of the Xen migration throughput—due to pausing the virtual machine.

The disruption time is 1.04 seconds, and practically unnoticeable by a human user. The HTTP throughput is reduced during the migration due to the throughput taken by the bulk transfer, as this experiment is network-limited. Note that, the amount of throughput allocated to the bulk transfer can be adjusted using straightforward rate limiting.

This experiment demonstrates that our system, integrated with the Xen live migration framework, is able to migrate a running common service (along with its local persistent state) without any noticeable disruption to its clients. Moreover, the additional amount of disruption caused by our system—the persistent state migration part only—is less than 1%; the observed disruption time is nearly identical to the measured downtime.

This also highlights the effectiveness of our migration framework for system maintenance. Given a high-availability SLA of 99.999% server uptime, our system allows up to 289 migrations in a year—or nearly six migrations a week—for server maintenance and upgrade, while still satisfying the SLA.

1.3.2 Web Server: Dynamic Web Application

For this test we run the phpBB bulletin board software in a virtual machine on host A, and evaluated the effect of the migration of this virtual machine to host B. To generate HTTP requests and file system writes, we built a web robot that crawled the bulletin boards at random and, when it came across a form for submitting posts to the board, it submitted an arbitrary post—this happened in 5% of cases. Each such post led to a MySQL query, which inserted data into a database. We run 250 simultaneous threads of this web robot on host C.

Figure 6:
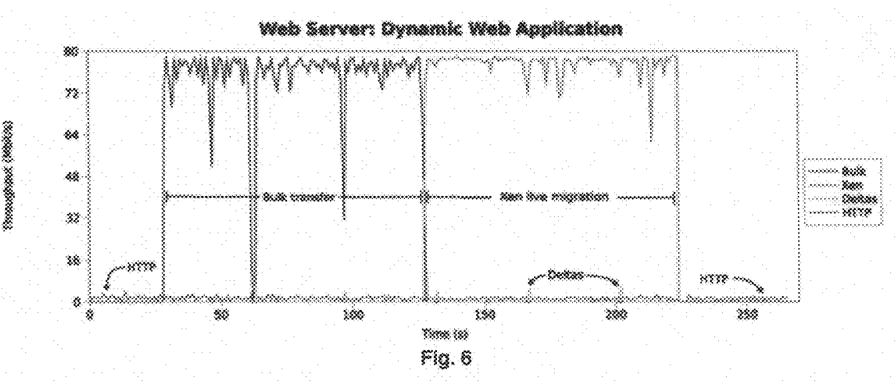
FIG. 6 is a diagram depicting a throughput of migration protocols during VM migration under dynamic web load according to an exemplary embodiment of the present invention.

The HTTP throughput as well as that of migration protocols was measured as described in Section 1.3.1, throughout the migration. The results of this experiment are shown in FIG. 6. Triggered by a migration request, the bulk transfer starts at 25 seconds, with the first large burst of deltas occurring after 62 seconds. Xen migration is invoked after 125 seconds, and the experiment finishes after 225 seconds.

Our system enables the migration of a running web server providing dynamic content backed by a database to 250 clients, with a disruption time of only 3.09 seconds. This is higher than in the static web workload experiment—as a result of the larger number of deltas due to the bulletin board posts, but it is still low enough not to be noticed by most human users in a web context. Furthermore, given the SLA described in the previous section, our system allows 98 migrations in a year for system maintenance and upgrade.

In contrast to the static web workload experiment, HTTP throughput is not significantly affected by migration. The reason is that the experiment is not network-limited—there is sufficient capacity for all flows. This is the reason why the total migration time is shorter. The higher variation of the bulk and Xen migration throughput is a result of the bursty nature of this workload, and the varying size of the web pages downloaded.

This experiment demonstrates that our system is effective in migrating running services that write to the local disk at a higher rate, and in a bursty fashion, without disrupting them severely. Similarly to the previous experiment, the measured disruption time is nearly identical to the downtime, which is entirely due to the Xen live migration process. This shows that our system provides important additional functionality (migration of local persistent state) without introducing additional disruption.

1.3.3 Streaming Video

In the previous scenario, variation in response time due to either the downtime from the final stage of the Xen live migration or from the replay time did not affect the user in a considerable way. Video streaming provides a different workload with few writes, but lower tolerance towards latency. In this experiment we streamed a large video file (245 MB) from the virtual machine to be migrated to a single client in host C, using standard HTTP streaming. The video was viewed on host C by a human user using a standard video player utility. While the video was being streamed, we measured the throughput of the video traffic and the migration protocols, as described in Section 1.3.1. We also measured the interarrival times of video packets on host C.

Figure 7:
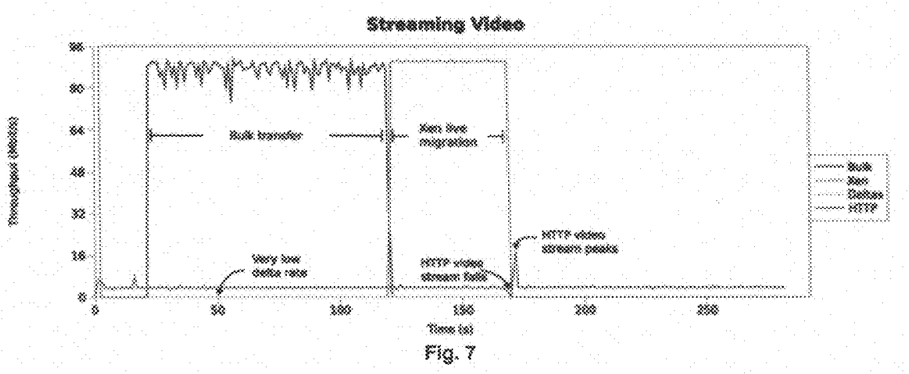
FIG. 7 is a diagram depicting a throughput of migration protocols during VM migration under video streaming load according to an exemplary embodiment of the present invention.

The throughput results of this experiment are shown in FIG. 7. The bulk transfer starts at 25 seconds and switches to Xen migration after 118 seconds. The relatively constant HTTP throughput is temporarily disrupted after 168 seconds, when the virtual machine is stopped at the source and started at the destination. The disruption time was again minimal (3.04 seconds), and it was alleviated by the buffer of the video player software. The human viewer did no-(notice any jitter or distortion of the video at any point during the migration of the running streaming server.

Figure 8:
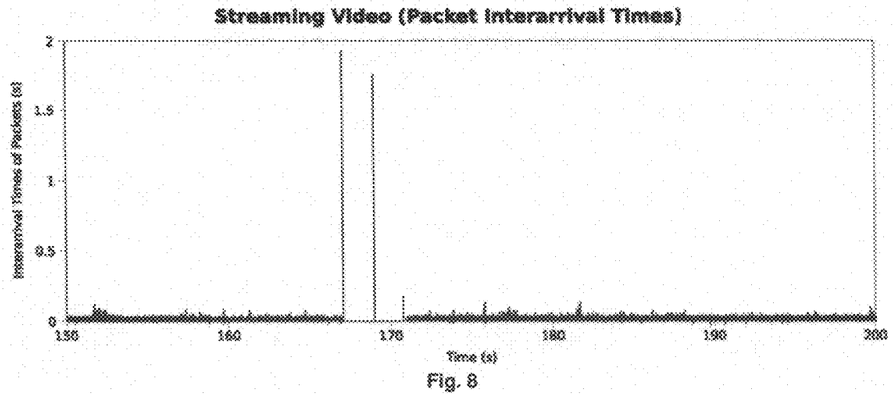
FIG. 8 is diagram of packet interarrival times durch VM migration under video streaming load according to an exemplary embodiment of the present invention.

This is supported by the recorded packet interarrival times measured, shown in FIG. 8, which demonstrate that there is no increase in the packet interarrival times except during the final stage of the Xen migration, when the virtual machine is paused. In this experiment no packets are lost as we use HTTP over TCP streaming. But we observe the effects of retransmission. Three packets have significantly increased delays followed by some packets with smaller interarrival times. Overall the disruption during that stage is short enough to be absorbed by the client buffer. As in previous experiments, the contribution of the persistent state migration process to the measured disruption time is negligible.

1.4 Comparison with Freeze-and-Copy

Here we compare our system against an approach using commodity freeze-and-copy solutions for transferring virtual machine state in a scenario similar to that described in Section 1.3.2. All HTTP traffic to and from host C was carried over the secondary network. Two approaches were tried for copying the virtual machine state: in the first one, we stopped the virtual machine on the source host, copied its memory, and disk state using the Secure Copy Protocol's (scp) command, and then resumed it at the destination.

In the second one, we used rsync in the following fashion. First, we synchronized the local disk image with the remote disk image by running rsync three times, while the virtual machine was still running—we experimentally found that this number of runs produced the most favorable results for the rsync approach. Then, we suspended the virtual machine on the source host, storing its memory state into an image file. Subsequently, we used sync to transfer the virtual machine's memory image file and disk image, and resumed the virtual machine on the destination host.

TABLE 2

Comparison with freeze-and-copy approaches, with HTTP traffic carried over the secondary network.

| | scp | rsync | Our system |
|---|---|---|---|
| LAN Migration time (s) | 148.32 | 228 | 206.79 |
| LAN Disruption time (s) | 148.32 | 72 | 3.12 |
| WAN Migration time (s) | 4585 | 2160 | 3777 |
| WAN Disruption time (s) | 4585 | 279 | 67.96 |

The results for freeze-and-copy migration are shown in Table 2. In the local area, scp results to a disruption of time of 148 seconds, while rsync achieves 72 seconds. Our system significantly outperforms both approaches by disrupting the service for only 3.12 seconds. The slight difference between this result and the one presented in Section 1.3.2 is due to the use of the secondary network for carrying HTTP traffic. In the wide area, the disruption that freeze-and-copy systems cause increases significantly, to 2160 and 279 seconds for scp and rsync respectively. To demonstrate the ability of our system to reduce these severe disruption time in wide-area scenarios, we undertook the following experiment.

1.5 Wide-Area Migration Results

This experiment evaluates the disruption caused by our system during a migration in the emulated wide-area environment described in Section 1.2.

We again run a web server providing a bulletin board as described in Section 1.3.2. However, in this case the HTTP traffic, e.g. requests and responses, was carried over the secondary network, in order to isolate the client-side measurements from the effect of rate limiting. This represents the case where the client is at an equal network distance from both the source and destination hosts.

Figure 9:
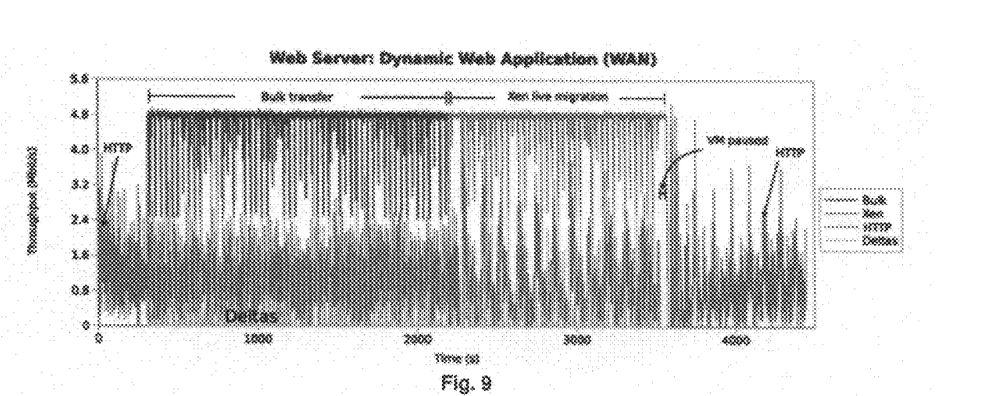
FIG. 9 is a diagram depicting a throughput of migration protocols during wide-area VM migration under dynamic web load according to an exemplary embodiment of the present invention.

The results of this experiment are shown in FIG. 9. The bulk transfer is started after approximately 260 seconds, and the Xen migration stage starts at around 2250 seconds. Migration finishes at 3600 seconds, having applied 16787 deltas to the destination file system. The much higher number of deltas observed is due to the lower bandwidth availability: the bulk transfer and Xen migration take longer, thus giving the virtual machine the opportunity to generate more disk writes at the source.

The disruption time, although higher at 68 seconds, is not surprising since the network bandwidth is ½0th of that in the LAN. This is nevertheless an improvement by a factor of 67.5 and 4.1 over the scp and rsync approaches respectively. This is shown in Table 2.

The total migration time is fairly long (one hour and sixteen minutes) and implies that the migration in the WAN requires more planning than in the local area case. It also underlines the research challenges of urgent migration in disasters or emergencies.

This experiment demonstrates that our system can be used to perform planned wide-area migration of running services and their local persistent state. Our system reduces service disruption by several orders of magnitude. Furthermore, the additional disruption introduced by our system is again negligible—the total disruption time is less than 1% higher than the downtime.

1.6 Diabolical Workload Results

If the virtual machine to be migrated writes to the disk at a very fast rate, it generates a large number of deltas, which consume most of the CPU cycles and network bandwidth. This prevents the migration from progressing. In our implementation we provide a mechanism for throttling such virtual machines.

To demonstrate the effectiveness of this mechanism, we run a diabolical workload generator in the virtual machine: the Bonnie7 I/O analysis tool. During the migration of the virtual machine we measured the throughput of the different flows, as in the previous experiments.

Figure 10:
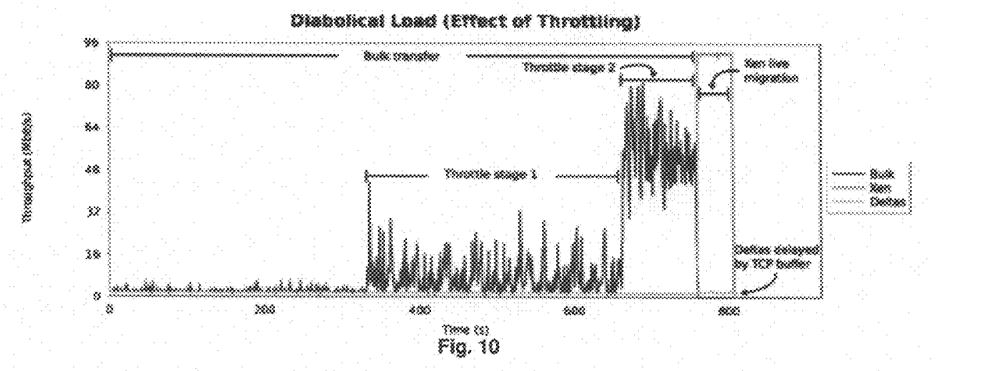
FIG. 10 is a diagram depicting a throughput of migration protocols during VM migration under diabolical I/O load according to an exemplary embodiment of the present invention.

FIG. 10 shows the results of this experiment. Initially, the bulk transfer process is starved for resources. It only transmits at 32 kbps, as most of the available CPU cycles are devoted to processing the writes and deltas. After approximately 325 seconds the virtual machine reaches the first write threshold (16384 writes) and our first-level throttle is invoked. This delays each write by 2048 microseconds and allows the bulk transfer's throughput to increase to more than 20 Mbps. At around 670 seconds the second-level throttle is invoked at 32768 writes. Now the write rate is reduced even further, allowing the bulk transfer and Xen live migration to continue at a higher pace.

The total migration time using throttling is 811 seconds. If the I/O load from the virtual machine was not throttled, the total time to transfer the bulk of the data would be just over 3 days. This underlines the effectiveness of our write throttling mechanism for dealing with extremely write-intensive workloads.

1.7 I/O Performance Overhead Results

Next, we demonstrate that the I/O performance overhead imposed by our system is not significant. We run the bonnie I/O benchmarking tool in a virtual machine on host A, and measured the throughput achieved in four different virtual machine I/O driver configurations: a) the unmodified case, where we used the off-the-shelf block tap and backend drivers found in Xen without any changes, b) the modified case, where we used our new backend without intercepting writes (i.e. before and after the virtual machine migration), c) the modified in record mode case, where our new backend was intercepting writes, and d) the modified during migration case, where I/O performance was measured during a migration of a virtual machine running the Bonnie tool.

TABLE 3

Disk I/O overhead

| Environment | Output throughput (KB/s) | % decrease from unmodified |
|---|---|---|
| Unmodified | 41462 | — |
| Modified | 41081 | 0.91% |
| Modified in record mode | 37455 | 9.66% |
| Modified during migration | 36505 | 11.96% |

The results of this experiment are shown in Table 3. Our modified backend introduces an overhead of 0.91% when the backend is not in record mode. This does not observably degrade the performance of the virtual machine and its services. When the record mode is turned on, I/O performance is reduced by 9.66%, which increases to 11.96% during a migration. However, as discussed in Section 1.1, this does not result in a significant disruption of the services from the clients' point of view.

This experiment demonstrates that, even under exceptionally heavy load, the I/O overhead incurred by using our system is minimal, and is only potentially observable during a migration. Combined with the observations of the previous experiments, this demonstrates that we are able to introduce additional functionality (migration of local persistent state) with only minimal reduction of performance.

The computer system described supports the transparent live migration of the local persistent state of virtual machines that use local storage for their persistent state. The system minimizes service disruption by allowing the virtual machine to continue running on the source host during the migration of its local persistent state, and ensures consistency by applying file system changes in the same order on both the source host and the destination host. Additionally, the system is transparent to the migrated virtual machines, as it does not requires changes to their operating systems or installation of custom software packages.

What is claimed is:

1. A computer system for transferring over a communication network storage data of a virtual machine to be migrated, the system comprising:
   a source host device configured to run the virtual machine thereon, the source host device including:
      a local storage device configured to store a disk image used by the virtual machine;
      a detecting arrangement configured to detect any changes made to the disk image while the virtual machine is running on the source host device;
      a migration arrangement configured to establish a connection to the destination host device over the communication network;
      a copying arrangement configured to pre-copy, to the destination host device, the stored disk image without stopping the virtual machine; and
   a destination host device including:
      a storage arrangement configured to store the transferred disk image and the detected any changes made; and
      a starting arrangement configured to start a migrated virtual machine at a current state of the virtual machine running on the source host device.

2. The computer system according to claim 1, wherein the detecting arrangement is configured to intercept, at least during the transfer of the disk image from the source host device to the destination host device, any write operation that occur on the disk image used by the virtual machine of the source host device and to generate a plurality of parameters which represent the changes of the disk image resulting from the respective write operations, and wherein the transferring arrangement is configured to transfer the plurality of parameters from the source host device to the destination host device, and wherein the plurality of parameters are queued at the storage arrangement of the destination host device in the order in which they have been generated by the at least one virtual machine running on the source host device.

3. The computer system according to claim 1, wherein the source host device includes a storage arrangement configured to store a memory state of the virtual machine running on the source host device, and wherein the transferring arrangement is configured to transfer the memory state to the destination host device without interrupting the virtual machine running on the source host device.

4. The computer system according to claim 1, wherein the communication network includes at least one of a TCP/IP based computer network and another network configured for in-order and reliable end-to-end delivery of transmitted information, and wherein at least disk image data is transferred block-wise from the source host device to the destination second host device.

5. The computer system according to claim 1, wherein at least one of the source and destination hosts include a host running Xen or a XenoServer.

6. A method for transferring storage data of a virtual machine to be migrated from a first host device to a second host device via a communication network, the method comprising:
   a) running the virtual machine on the first host device;
   b) storing, on a local storage device of the first host device, a disk image used by the virtual machine;
   c) detecting, while the virtual machine is running on the first host device, any changes made to the disk image used by the virtual machine;
   d) establishing a connection over the communication network from the first host device to the second host device;
   e) transferring, to the second host device while the virtual machine is running on the first host device, the disk image used by the virtual machine and the detected any changes made;
   f) modifying the disk image transferred to the second host device in response to the detected any changes transferred to the second host device; and
   g) starting, using the modified disk image, a migrated virtual machine on the second host device at a current state of the virtual machine running on the first host device.

7. The method according to claim 6, wherein step c) includes intercepting, at least during the transfer of the disk image from the first host device to the second host device, any write operations that occur on the disk image used by the virtual machine of the first host device and generating a plurality of parameters which represent the modifications of the disk image resulting from the respective write operations, and wherein step e) includes transferring the plurality of parameters from the first host device to the second host device, wherein the plurality of parameters are queued at the second host device in the order in which they have been generated by the virtual machine running on the first host device.

8. The method according to claim 7, wherein the parameters queued at the second host device are applied to the disk image transferred to the second host device in the order in which they occurred at the first host device.

9. The method according to claim 6, wherein step e) includes transferring a memory state of the virtual machine running on the first host device to the second host device without interrupting the virtual machine running on the first host device.

10. The method according to claim 9, wherein the memory state is transferred after completion of the transferring of the disk image.

11. The method according to claim 10, wherein step c) includes intercepting, during the transfer of the disk image and the memory state from the first host device to the second host device, any write operation that occur on the disk image used by the virtual machine running on the first host device and generating a plurality of parameters which represent the modifications of the disk image resulting form the respective write operations.

12. The method according to claim 11, wherein after the transfer of the memory state the virtual machine running on the first host device is paused and the migrated virtual machine is started at the second host device.

13. The method according to claim 6, wherein the communication network includes at least one of a TCP/IP based computer network and another network configured for in-order and reliable end-to-end delivery of transmitted information, and wherein step e) includes transferring at least data of the disk image block-wise from the first host device to the second host device.

14. The method according to claim 6, further comprising defining a threshold for a number of write operations which can be executed by the virtual machine running on the first host device during a predetermined time period and delaying by an adjustable delay value the write operations exceeding the threshold.

15. The method according to claim 6, wherein the method is performed in a Xen environment.

16. A computer-readable medium having stored thereon a set of instructions that are executable by a control unit to perform a method for transferring storage data of a virtual machine to be migrated from a first host device to a second host device via a communication network, and including:
   a) running the virtual machine on the first host device;
   b) storing, on a local storage device of the first host device, a disk image used by the virtual machine;
   c) detecting, while the virtual machine is running on the first host device, any changes made to the disk image used by the virtual machine;
   d) establishing a connection over the communication network from the first host device to the second host device;
   e) transferring, to the second host device while the virtual machine is running on the first host device, the disk image used by the virtual machine and the detected any changes made;
   f) modifying the disk image transferred to the second host device in response to the detected any changes transferred to the second host device; and
   g) starting, using the modified disk image, a migrated virtual machine on the second host device at a current state of the virtual machine running on the first host device.

* * * * *